United States Patent [19]

Puck

[11] 4,217,158
[45] Aug. 12, 1980

[54] METHOD OF FORMING PRESTRESSED FILAMENT WOUND PIPE

[75] Inventor: Alfred Puck, Basel, Switzerland

[73] Assignee: Ciba-Geigy Corporation, Ardsley, N.Y.

[21] Appl. No.: 947,806

[22] Filed: Oct. 2, 1978

[30] Foreign Application Priority Data

Oct. 3, 1977 [CH] Switzerland ............... 12049/77
Oct. 18, 1977 [CH] Switzerland ............... 12676/77

[51] Int. Cl.² .......................................... B65H 81/00
[52] U.S. Cl. ............................. 156/156; 156/175; 156/425
[58] Field of Search ............... 156/165, 161, 172, 173, 156/175, 425, 156, 329

[56] References Cited

U.S. PATENT DOCUMENTS

| | | | |
|---|---|---|---|
| 2,984,870 | 5/1961 | Warnken | 156/165 |
| 3,033,730 | 5/1962 | Martin | 156/165 |
| 3,202,560 | 8/1965 | Michael | 156/155 |
| 3,210,228 | 10/1965 | Bluck | 156/172 |
| 3,231,442 | 1/1966 | Michael | 156/165 |
| 3,282,757 | 11/1966 | Brussee | 156/172 |

*Primary Examiner*—Michael W. Ball
*Attorney, Agent, or Firm*—Harry Falber

[57] ABSTRACT

A method of manufacturing a glass fibre reinforced pipe by winding a first resin impregnated pipe layer of glass fibres oriented approximately in the circumferential direction and setting the layer so formed. The set first pipe layer is then subjected to axial pressure loading by an external force and a pressure medium from inside. A second resin impregnated pipe layer having glass fibres extending approximately in the axial direction is then applied to the loaded first pipe layer, and set. After setting, the external pressure force and the pressure medium are removed so that a residual stress or prestress condition forms in the finished pipe.

7 Claims, 2 Drawing Figures

METHOD OF FORMING PRESTRESSED FILAMENT WOUND PIPE

This invention relates to a method of manufacturing a glass fibre reinforced plastic pipe.

To the applicant's knowledge, there are no glass reinforced plastic pipes in which the arrangement of fibres will withstand high stresses $\sigma\|$ parallel to the fibres without considerable transverse stresses $\sigma|$ occuring at the same time. While the strength parallel to the fibres is about 850 N/mm$^2$, the best value that can be achieved for the transverse tensile strength is 70 N/mm$^2$. Consequently, cracking due to the $\sigma\perp$ stresses occurs under loads which are not sufficient to produce $\sigma\|$ fibre fractures. In principle, these difficulties can be overcome by the deliberate incorporation of residual stresses or prestresses in the pipe as disclosed, for example, in U.S. Pat. Nos. 2,984,870, 2,999,272 and 3,202,560. In U.S. pat. No. 2,984,870 a resin-impregnated glass-fibre reinforced mat is first rolled up to form a tubular preform, the glass fibres in the mat being orientated at an angle of $\pm 45°$ relative to the axis of the tubular preform. The tubular preform is then clamped at its ends and subjected to axial tensile loading during setting of the resin impregnated fibre mat. At the same time, a hydraulic or pneumatic pressure is applied inside the preform. A residual stress or prestress condition is imparted to the pipe as a result of the tensile and pressure loading of the tubular preform during setting. In the U.S. Pat. No. 3,202,560 a glass fibre reinforced plastic pipe is manufactured by winding resin-impregnated glass-fibre strands on a mandrel in a multi-layer 0°/90° fibre arrangement. The fibre strands are kept under tension during both coiling and setting, so that the pipe after setting also has a prestress condition.

There appears to be a wide-spread prejudice against prestressed glass-fibre reinforced plastic materials, since it is thought that built-in prestress conditions rapidly relax owing to the visco-elastic behaviour of plastics, and therefore cannot be maintained very long. Only in the preliminary work on the present invention was it quite surprisingly found that contrary to prejudice the relaxation times of such glass fibre reinforced plastic materials were many orders of magnitude longer than previously assumed. The reason for this is that once the required operational state $\sigma| = 0$ has been reached, this state cannot change due to creep or relaxation, because as the transverse tensile stress disappears any creep or relaxation stops, since the remaining fibre-parallel stresses do not relax. In practice this means that care must be taken to ensure that between the time the pipe is produced and used there is an adequate residue left of the prestress imparted to the tube during manufacture, and this does not give rise to any difficulty in view of the unexpectedly high relaxation times. A "reserve" can also be provided, by increasing the prestress imparted during manufacture, by an amount equivalent to the estimated fall-off due to relaxation, or if required by an amount in excess thereof.

An object of the invention therefore is to provide an improved production process for prestressed glass fibre reinforced plastic pipes which requires only relatively modest outlay in terms of production, and produces high-grade prestressed glass fibre reinforced plastic pipes.

The method according to the invention is characterised by first winding a first pipe layer with glass fibres oriented approximately in the circumferential direction this first pipe layer, after setting, being subjected to axial pressure loading by an external force applying a second pipe layer with a glass fibre winding comprising fibres oriented approximately in the axial direction to the loaded first pipe layer, setting the second pipe layer and then removing the external force after the second pipe layer has been set. Preferably, the first pipe layer is internally subjected to a pressure medium during the application and setting of the second pipe layer. The axial loading and the pressure of the pressure medium are approximately so chosen that the pipe experiences a residual stress or prestress which at least partially compensates for the transverse tensile stresses occurring during nominal loading of the pipe and extending perpendicularly to the glass fibres, and the longitudinal tensile stresses occurring in the two pipe layers under nominal loading of the pipe an extending parallel to the fibres are at least approximately equal.

A preferred embodiment of the invention will be explained in detail hereinafter with reference to the accompanying drawings in which.

Figure 1:
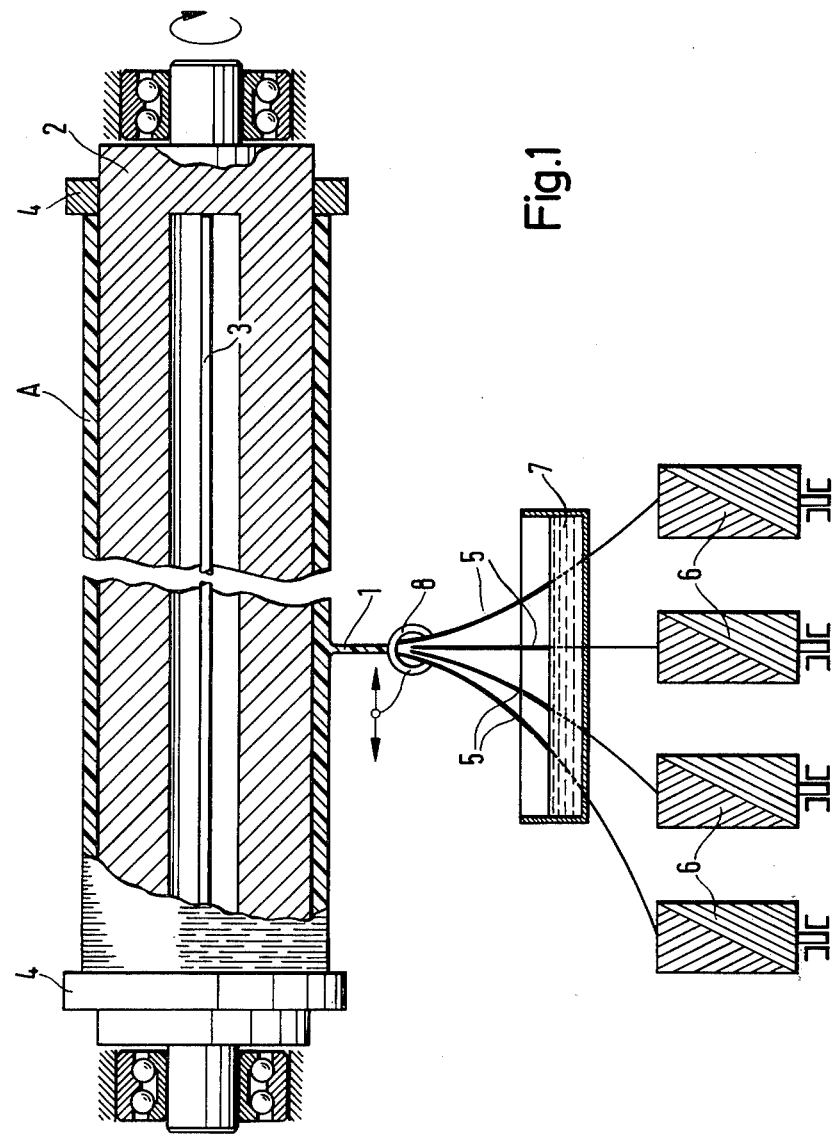
FIG. 1 shows the winding of the first pipe layer.
Figure 2:
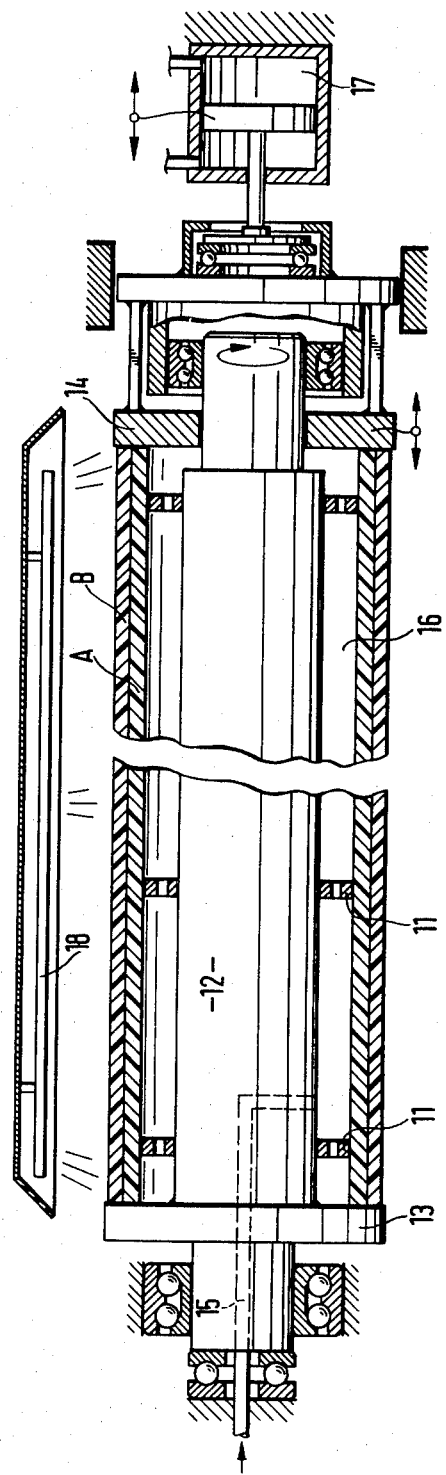
FIG. 2 shows the application of the second pipe layer.

The first stage comprises producing the pipe layer having the glass fibres oriented circumferentially. As shown diagrammatically in FIG. 1 this is done by winding a resin-impregnated glass fibre strand 1 on a hollow mandrel 2. The mandrel is rotated and its interior contains an infra-red heating element 3 for setting the pipe winding. The mandrel has two flanges 4 to give neat pipe ends. The glass fibre strand 1 consists of a plurality of fibres 5 which converge from feed reels 6, through a resin-impregnating bath 7, to a winding ring 8. The latter reciprocates in known manner between the two flanges 4 to form a multi-layer winding A in which the orientations of the glass fibres in consecutive layers are symmetrical in relation to the pipe axis.

After the resulting first pipe layer A has set, it is transferred to another mandrel 12, the circumference of which has support ribs 11 and which is also rotated and clamped between two flanges 13 and 14. Flange 13 is axially fixed and has an inlet or connection 15 for a pressure medium which leads into the intermediate space 16 between the surface of the mandrel and the inner wall of the pipe layer A. The ribs 11 have communication apertures so that the pressure medium can fill the entire intermediate space 16.

Flange 14 is adjustable axially by means of a hydraulic cylinder 17. Before the second pipe layer is produced, the first pipe layer A is subjected to axial pressure stressing by means of the hydraulic cylinder 17 and the flange 14, while the layer A is also expanded somewhat circumferentially by pressurising the pressure medium in the intermediate space 16. A number of layers of substantially axially oriented resin-impregnated glass fibres are now applied to the stressed pipe layer A, and setting of the second pipe layer B so formed is produced by means of an infra-red radiator 18. Here again the glass fibres in adjacent layers are oriented symmetrically to the pipe axis. The resulting multi-layer axial glass fibre winding forms the second layer B of the plastics pipe.

When the second pipe layer has set sufficiently, the axial stressing and the internal pressure in the pipe are removed. The stress originally imparted to the inner pipe layer by the axial loading and by the internal pressure are partly retained in the pipe as a prestress state.

A non-flexibilized laminating resin having a modulus of elasticity of between 3000 and 4000 N/mm² is used for the pipe construction. The glass volume proportion is preferably about 60%. E-glass with a modulus of elasticity of about 73000 N/mm² is advantageously used.

Given suitable values for the prestress condition incorporated, according to the invention, in the glass fibre plastic pipe the transverse tensile stresses occurring during operational loading of the pipe can be practically completely compensated for. This enables the pipe to be designed as if the stress condition were not a multi-axis one, but solely a single-axis condition. In practice, this means a drastic reduction of the pipe wall thickness required for a given nominal loading, and the consequent advantages. For example, a total wall thickness of about 15 mm is now required for a natural gas pipe having an inside diameter of 600 mm designed for a nominal operating pressure of 64 bar, as against 50 mm (DIN 19694) with conventional pipes.

The following are the data for the production of the above mentioned pipe:

| | |
|---|---|
| Wall thickness of inner layer: | 13 mm |
| Wall thickness of outer layer: | 2 mm |
| Resin: non-flexibilized, modulus of elasticity 3500 N/mm² | |
| Glass fibres: E-glass, modulus of elasticity 73000 N/mm² | |
| Glass volume proportion: | 60% |

Axial loading during production of second layer: 40N/mm²

Hydrostatic pressure of pressure medium: ~80 bar

Orientation of winding to pipe axis: ±85° and ±5°

With a pipe dimensioned in this way, the transverse tensile stresses are practically completely compensated for at nominal loading (64 bar).

In practice it is advantageous for the prestress incorporated in the pipe to be somewhat greater than would be required per se to compensate for the transverse tensile stress. In this way, even load peaks in excess of the pipe nominal loading can be taken without damage while in addition the fact that the residual stress or prestress condition falls off (although only slightly) due to relaxation if the pipes are stored for any great length of time between the production and use of the pipes, can also be allowed for.

The pipe dimensions and the prestresses to be incorporated therein, i.e. the necessary axial loading and medium pressures required for the purpose during production is determined by reference to the following formulae for the specific case of a pipeline subject to no axial elongation.

Starting from a given operating pressure and nominal diameter, and a selected pipe structure (resin, glass, glass fraction, winding angle, etc.,) which determines the elastic behaviour of the pipe (modulus of elasticity, transverse contraction index), and the three fundamental requirements as follows:

(a) the axially extending transverse tensile stresses occurring during operation in pipe layer A,
(b) the transverse tensile stresses in the circumferential direction in pipe layer B should be compensated or even over-compensated; and
(c) the stresses parallel to the glass fibres in the two pipe layers should be equal as far as possible, the known rules of the continuum theory (Dissertation A. Puck of the Engineering Faculty of the Technische Universitat Berlin, D 83, of 6 July 1966) give the following formulae for the ratio $t_1'$ of the wall thickness $t_1$ of the pipe layer A to the total wall thickness t:

$$t_1' = \frac{t_1}{t} = \frac{Z}{2N} + \sqrt{\left(\frac{Z}{2N}\right)^2 + f \cdot \frac{E_{y2}}{N}} \quad (I)$$

where $Z = E_{y1} - (2f + \nu_{yx2}) \cdot E_{y2}$
$N = (1 + f \cdot \nu_{yx1})E_{y1} - (f + \nu_{yx2}) \cdot E_{y2}$ $$t = \frac{P_B \cdot r_{i1}}{t_1' \cdot \sigma_{y1zu1}} \quad (II)$$

The following are the meaning of the symbols in these and the following formulae:

Indices 1 and 2: Reference to pipe layers A and B, respectively,

Indices x and y: Axial and circumferential direction respectively,

Indices γ E and B: Conditions during application of external loading during manufacture of the pipe, conditions after removal of this external loading, and the stresses produced by the operational loading, respectively, $P_B$: Nominal operating pressure for which the pipe is to be designed.

$r_{i1}$: Inside radius of pipe layer A $\sigma y1_{zu1}$: Permissible circumferential stress of the layer A (~140 N/mm²)

f: Factor by which the prestress to be incorporated is to exceed the value required for compensating the transverse tensile stress; $1 \leq f \leq 1.5$ $E_{y1}, E_{y2}$: Modulus of elasticity in the y direction

| | |
|---|---|
| $\gamma_{yx}, \gamma_{yx2}:$ $\gamma_{xy1}, \gamma_{xy2}:$ | Transverse contraction indices, the first index denoting the direction of the contraction and the second index the direction of the causal stress. |

σ: Stress

Δσ: Change of stress on transition from state γ to state E.

$\Sigma x_E, \Sigma y_E$: Associated elongations.

The formulae I and II fix the wall thicknesses of the two pipe layers A and B. Calculation of the external loading necessary to produce the required prestress (axial prestressing force $F_{x1\nu}$, hydrostatic pressure $P_\nu$ of pressure medium) is on the basis of the following formulae III and IV:

$$F_{x1\nu} = 2\pi \cdot (r_{i1} + \frac{t_1}{2}) \cdot t_1 \cdot \sigma_{x1\nu} \quad (III)$$

$$P_\nu = \frac{t_1 \cdot \sigma_{y1\nu}}{r_{i1}} \quad (IV)$$

where
$\sigma_{x1\nu} = \sigma_{x1E} - \Delta\sigma_{x1} ; \sigma_{y1\nu} = \sigma_{y1E} - \Delta\sigma_{y1}$ $$\Delta\sigma_{x1} = \frac{E_{x1}}{1 - \nu_{xy1} \cdot \nu_{yx1}} \epsilon_{xE} + \frac{\nu_{yx1} \cdot E_{y1}}{1 - \nu_{xy1} \cdot \nu_{yx1}} \cdot \epsilon_{yE}$$

$$\Delta\sigma_{y1} = \frac{\nu_{yx1} \cdot E_{y1}}{1 - \nu_{xy1} \cdot \nu_{yx1}} \epsilon_{xE} + \frac{E_{y1}}{1 - \nu_{xy1} \cdot \nu_{yx1}} \cdot \epsilon_{yE}$$

$$\epsilon_{xE} = \frac{1}{E_{x2}} \cdot \sigma_{x2E} - \frac{\nu_{xy2}}{E_{y2}} \cdot \sigma_{y2E}$$

$$\epsilon_{yE} = \frac{-\nu_{xy2}}{E_{y2}} \cdot \sigma_{x2E} + \frac{1}{E_{y2}} \cdot \sigma_{y2E}$$

-continued $$\sigma_{x1E} = -f \cdot \nu_{yx1} \cdot E_{y1} \cdot \frac{t'_1 \cdot \sigma_{y1} \, zul}{E_{y1} \cdot t'_1 + E_{y2}(1 - t'_1)}$$

$$\sigma_{y2E} = -f \cdot E_{y2} \cdot \frac{t'_1 \, \sigma_{y1} \, zul}{E_{y1} \cdot t'_1 + E_{y2}(1 - t'_1)}$$

$$\sigma_{x2E} = -\frac{t'_1}{1 - t'_1} \cdot \sigma_{x1E}$$

$$\sigma_{y1E} = -\frac{1 - t'_1}{t'_1} \cdot \sigma_{y2E}$$

With other pipe installations in which the axial elongation is not obstructed, as it is in pipelines, the layer thicknesses and the prestress loadings must be calculated by the elasticity theory of multi-layer bonds. This theory includes equilibrium conditions, geometric conditions, and the elasticity laws of the two layers. Further details on this will be found in the above mentioned dissertation.

Angles of between ±80° to 88° and between ±2° to 10° preferably about 85° and 5°, relative to the tube axis, have proved advantageous for the orientation of the glass fibres in the two pipe layers A and B respectively. The winding angles indicated are only examples. Of course the winding angles could in special cases differ more sharply from the ideal case, i.e. 90° and 0°. The important point is that there should be a layer with fibres oriented substantially in the longitudinal direction and a layer with fibres oriented substantially in the circumferential direction.

To avoid cracking it is particularly advantageous for each pipe layer to be wound as a multiple layer, the orientation of the glass fibres in adjacent layers being symmetrical to the pipe axis, i.e. for example +5° and −5° and +85° and −85° (which inhibits the formation of cracks). The thickness of the individual layers may be about 0.5 to 1.0 mm.

In cases where the requirements are not so strict, it is of course possible not to satisfy all three of the above mentioned requirements, which are equivalent to the ideal case; instead requirements (a) and (b) or possibly just (a) alone may be satisfied. Compensation only of the transverse tensile stress occurring in layer A is already a considerable advantage.

Although it is advantageous for production reasons, it is not absolutely essential for the second pipe layer having the axially oriented fibres to be formed on the first pipe layer having the circumferential fibres. The second pipe layer could, for example, be formed on the inside of the first layer or there could be two layers with axial fibres, one on the inside and the other on the outside of the first layer.

I claim:

1. A method of manufacturing a glass fibre reinforced plastic pipe by winding a first resin impregnated pipe layer of glass fibres oriented approximately in the circumferential direction, setting the first pipe layer, subjecting the set first pipe layer to axial compressive pressure loading by an external force and to radial pressure loading by an internal pressure medium; forming a second resin impregnated pipe layer of glass fibres oriented approximately in the axial direction on the loaded first pipe layer, setting the second pipe layer, and removing the external force and the pressure medium after the second pipe layer has set.

2. A method according to claim 1, including subjecting the interior of the first pipe layer to a pressure medium during the application and setting of the second pipe layer.

3. A method according to claim 1, wherein the axial loading and the pressure of the pressure medium are chosen so that there is imparted to the pipe a residual stress or prestress which at least partially compensates for transverse tensile stresses produced by the pipe being loaded with a nominal pressure and directed perpendicularly to the glass fibres.

4. A method according to claim 3, wherein the residual stress or prestress imparted to the pipe result in the longitudinal tensile stresses occurring in the two pipe layers under nominal loading of the pipe and extending parallel to the fibres being at least approximately equal.

5. A method according to any one of claims 1, 3 or 4, wherein each pipe layer comprises at least two layers in which the glass fibres in each layer are oriented symmetrically to the pipe axis.

6. A method according to claim 5 wherein the first pipe layer is wound in two adjacent layers, one at approximately +85° and the other at approximately −85° to the pipe axis; and the second layer is formed with two adjacent layers, one at approximately +5° and the other at approximately −5° to the pipe axis.

7. A method according to any one of claims 1, 3 or 4, wherein the resin comprises a non-flexibilized laminating resin having a modulus of elasticity of about 3000 to 4000 N/mm².

* * * * *